United States Patent

Martenas et al.

[11] Patent Number: 5,261,700
[45] Date of Patent: Nov. 16, 1993

[54] FUEL TANK ASSEMBLY FOR A VEHICLE

[75] Inventors: Wayne B. Martenas, New Holland, Pa.; Geoffrey Wilkins, Corringham, England

[73] Assignee: Ford New Holland, Inc., New Holland, Pa.

[21] Appl. No.: 888,675

[22] Filed: May 27, 1992

[51] Int. Cl.$^5$ ............................................... B60P 3/22
[52] U.S. Cl. ..................................... 280/834; 141/86; 220/86.2
[58] Field of Search .................. 280/830, 834; 141/86, 141/88; 220/86.2, 86.3, DIG. 33

[56] References Cited

U.S. PATENT DOCUMENTS

| | | | |
|---|---|---|---|
| 3,467,274 | 9/1969 | Schmitt | 220/86.2 |
| 4,013,105 | 3/1977 | Uuskallio | 220/86.2 |
| 4,079,952 | 3/1978 | Nishio et al. | 280/234 |
| 4,099,645 | 7/1978 | Muth et al. | 220/86.2 |
| 4,157,104 | 6/1979 | Lofquist, Jr. | 220/86.2 |
| 4,651,889 | 3/1987 | Uranishi et al. | 280/834 |
| 4,701,198 | 10/1987 | Uranishi et al. | 280/834 |
| 4,817,691 | 4/1989 | Lau | 141/86 |

FOREIGN PATENT DOCUMENTS

| | | | |
|---|---|---|---|
| 2593753 | 8/1987 | France | 280/834 |
| 194627 | 11/1983 | Japan | 280/834 |
| 37213 | 2/1987 | Japan | 280/834 |

Primary Examiner—Margaret A. Focarino
Assistant Examiner—Kevin Hurley
Attorney, Agent, or Firm—Larry W. Miller; Frank A. Seemar

[57] ABSTRACT

A vehicle having a base structure with bodywork and a fuel tank assembly mounted on the base structure is disclosed wherein the fuel tank assembly includes a fuel tank having a filler neck, access to the inlet of which is gained through an aperture in a panel forming part of the bodywork. A grommet, fitted to the filler neck, has a skirt portion at one end, adapted to encircle the filler neck, at least one flange at the other end, adapted to engage the edge portion of the aperture in the panel, and an overflow channel disposed between the flange and the skirt. The overflow channel is provided with an outlet adapted for connection to a drain pipe. The filler neck is also provided with an outer portion of a first cross-sectional area and an adjacent inner portion of a second cross-sectional area which is smaller than the first cross-sectional area.

17 Claims, 4 Drawing Sheets

FUEL TANK ASSEMBLY FOR A VEHICLE

BACKGROUND OF THE INVENTION

This invention relates to a fuel tank assembly for a vehicle. The invention has been conceived in relation to an agricultural tractor but it is to be understood that the invention is applicable to a fuel tank assembly for any vehicle.

In agricultural tractors, it is common to have the opening of a fuel tank filler neck disposed generally close to, if not actually flush with, a panel of the tractor bodywork such that, if there is any spillage of fuel resulting from a misguided entry of fuel or from backflow, the spilled fuel is spread over the adjacent panel and will run down the latter and on to any adjacent components. The immediate disadvantage of this is that the film of fuel on the panel and other components quickly attracts dust and dirt, and other foreign matter, which is unsightly. In some instances, the fuel tank is located close to the engine so that there can be a danger of any spilled fuel reaching the hot engine which is clearly undesirable.

Additionally, in some instances the fuel tank is mounted forwardly of the radiator of the engine cooling system and the spilled fuel may be sucked into the radiator by the fan which is conventionally provided to draw cooling air through the radiator. This is also a grave disadvantage inasmuch as the fuel on the radiator will also attract dust and dirt and this could eventually lead to a blockage of the radiator with possible overheating of the engine. Furthermore, with such an arrangement, it is possible for the spilled fuel to be sucked through the radiator and thrown out from the outlet side of the fan on to the windscreen of the cab. Again, the film of fuel on the windscreen will attract dust and dirt and thus impair the visibility of the operator.

SUMMARY OF THE INVENTION

It is an object of this invention to overcome the aforementioned disadvantages of the prior art by providing a fuel tank with a overflow channel to minimize fuel spillage.

According to a first aspect of the present invention there is provided a vehicle comprising a base structure and bodywork and a fuel tank assembly mounted thereon; said fuel tank assembly comprising a fuel tank having a filler neck, access to the inlet of which is gained through an aperture in a panel forming part of said bodywork and said vehicle being characterized in that said fuel tank assembly further also comprises a grommet having a skirt at one end and adapted to encircle said filler neck, at least one flange at the other end and adapted to engage the edge portion of said aperture in said panel and an overflow channel disposed between said flange and said skirt and surrounding said inlet of said filler neck; said overflow channel being provided with an outlet adapted for connection to a drain pipe. Preferably, the grommet comprises a pair of spaced-apart flanges at said outer end and which are adapted to receive the edge portion of said aperture in said panel in the space therebetween.

Thus in accordance with this aspect of the present invention, any fuel which is misdirected into the inlet of the filler neck and/or backflows from the filler neck will tend to collect in the overflow channel and be drained therefrom to ground through the drain pipe, whereby the adjacent bodywork of the vehicle and/or the cooling radiator and/or other components are kept free from spilled fuel, whereby the disadvantages discussed above are avoided.

Conveniently, the filler neck and the grommet are cylindrical and the outer diameter of the body of a conventional filler cap for closing the filler tube is preferably dimensioned so that this body of the filler cap substantially closes the entrance to the overflow channel in the grommet, when in position, thereby denying access to dust and dirt which would otherwise be attracted to any fuel remaining in said overflow channel. The grommet is conveniently made of a synthetic plastics material which provides a good seal with respect to the filler neck and the adjacent panel of the vehicle bodywork as well as being resistant to petrol or diesel fuel.

In the case of agricultural vehicles, for example tractors, the fuel tank often needs refilling in the field or away from the tractor depot and this often is being accomplished by the use of a jerrycan or other container of fuel, the fuel being poured from the jerrycan into the filler neck of the fuel tank. This is one instance where the fuel may well be misdirected into the filler neck and thus be spilled. To help avoid spillage in these circumstances, it is clearly desirable to have as large a filler neck as possible in order to accommodate the less well defined flow of fuel from a jerrycan or other container. However, a filler neck with an enlarged inlet is not convenient when the fuel tank is filled using a conventional filler nozzle attached to the end of a fuel pipe in turn attached to a fuel reservoir. If the filler nozzle is hand held, then an enlarged filler neck does not give rise to any problems but if it is required to leave the nozzle on auto-fill, then a problem does arise because the enlarged filler neck does not allow the filler nozzle to be positively retained, with the resultant likelihood of the nozzle jumping out of the filler neck and thereby wasting considerable amounts of fuel.

According to a second aspect of the present invention, this problem is solved by providing a fuel tank assembly for a vehicle and comprising a fuel tank fitted with a filler neck; said fuel tank assembly being characterized in that the filler neck thereof comprises an outer portion of a first cross-sectional area, and an adjacent inner portion of a second cross-sectional area which is less than the first cross-sectional area.

Thus, this hybrid construction of a filler neck neatly accommodates both the filling of the fuel tank manually from a container such as a jerrycan and the filling of the fuel tank using a conventional fuel nozzle, which nozzle can be retained in the inner portion of the filler neck so that the auto-fill technique can be employed. A conventional filler neck usually has a diameter of the order of 40 mm which snugly accommodates a conventional fuel filler nozzle. However, in one embodiment according to the second aspect of the present invention, the inlet end of the outer portion of the filler neck has an inner diameter of the order of 100 mm, thus providing a considerably enlarged fuel inlet. The inner and outer portions of the filler neck may be integral or separate and the inner portion may be cup-shaped with the bottom of the cup provided with an aperture dimensioned to snugly receive a fuel nozzle and thus typically of the order of 40 mm in diameter. One or more vent apertures may be provided in the side wall of the inner portion of the filler neck and conveniently, these are also dimensioned so as to be capable of receiving and retaining a fuel nozzle. To this end, it is more convenient if the inner portion of the filler neck is of frusto-conical shape in order to present the vent apertures at a better angle for receiving the fuel nozzle.

It will be appreciated that a tank assembly in accordance with the second aspect of the present invention is readily incorporated into a vehicle in accordance with the first aspect of the invention.

BRIEF DESCRIPTION OF THE DRAWINGS

The present invention will now be described in greater detail, by way of example, with reference to the accompanying drawings in which.

DETAILED DESCRIPTION OF THE PREFERRED EMBODIMENT

Figure 1:
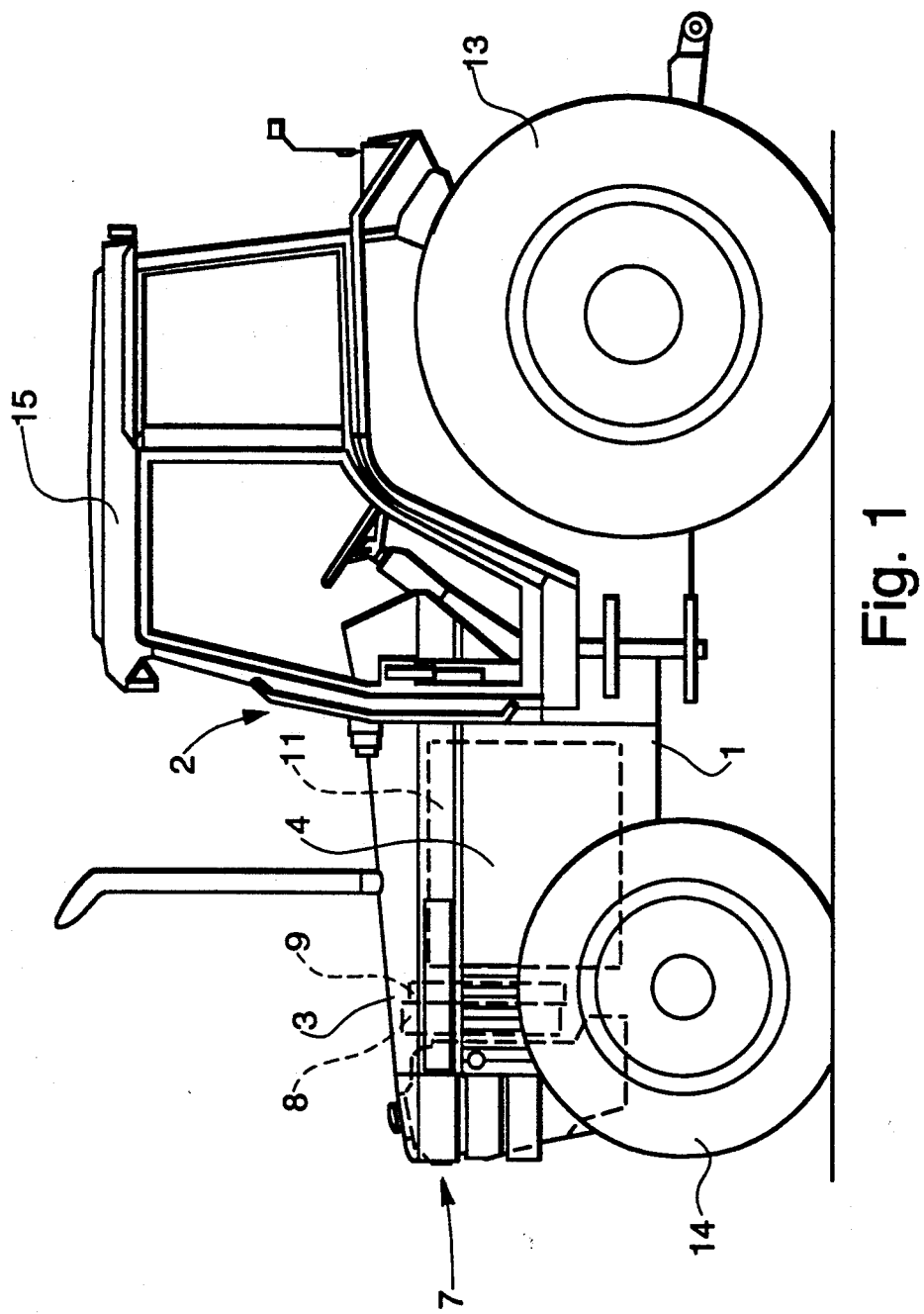
FIG. 1 is a side view of a tractor embodying the principles of the instant invention.
Figure 2:
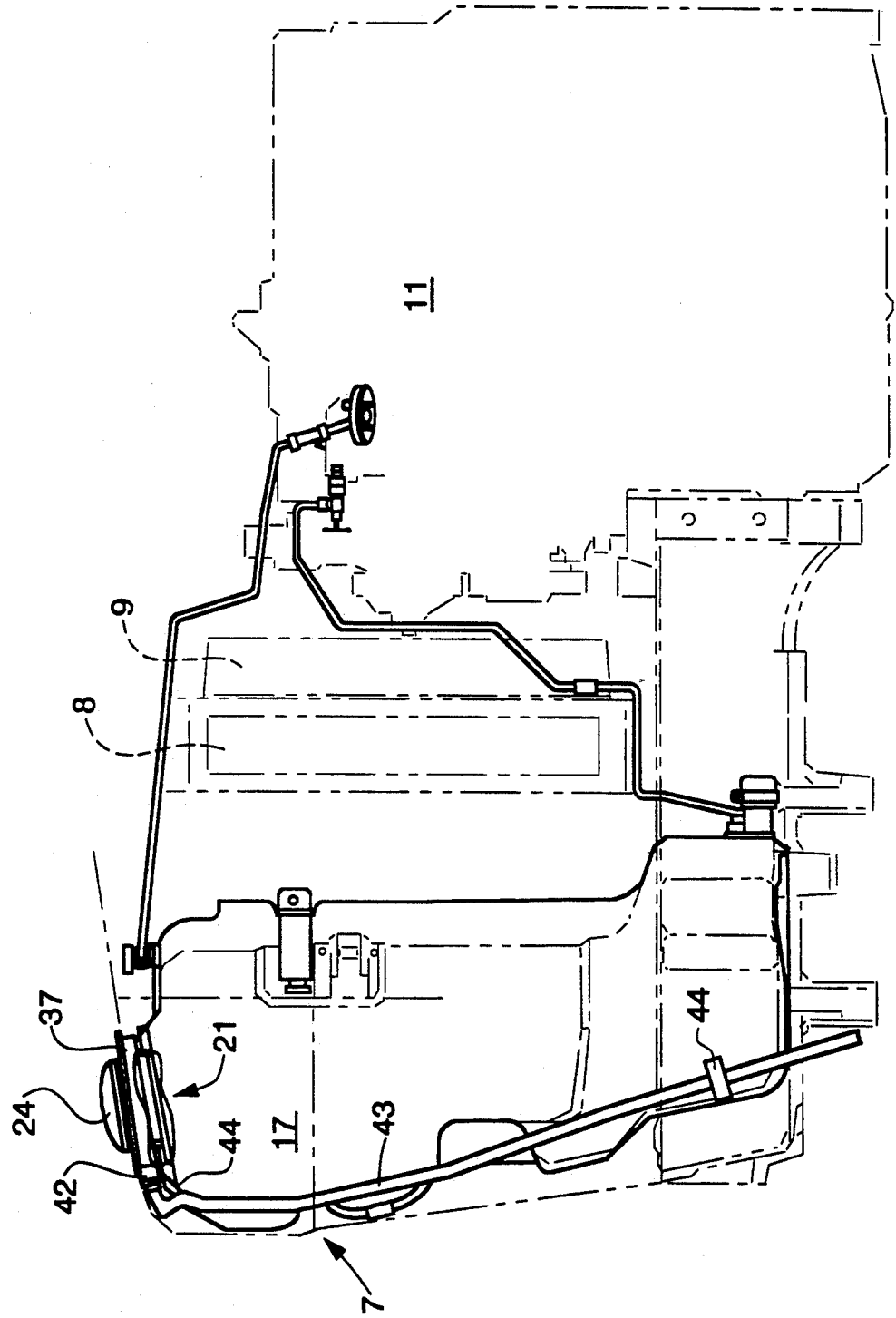
FIG. 2 is an enlargement of a portion of FIG. 1, with certain parts broken away for purposes of clarity.

Referring first to FIG. 1, this illustrates a tractor comprising a base structure 1 on which is mounted bodywork 2 including panelwork 3 forming the top of an engine compartment cover; this cover being completed by two side panels 4 which are provided adjacent to the top panel 3. The engine compartment contains a fuel tank assembly 7 mounted at the front end of the compartment, a radiator 8 forming part of an engine cooling system and mounted next to, and rearwardly of, the fuel tank assembly 7, a fan assembly 9 operable to draw cooling air through the radiator 8 and disposed adjacent, and rearwardly of, the latter, and an engine 11 mounted rearwardly of the fan assembly 9. The engine 11 is associated with a drive transmission through which a pair of rear, ground-engaging wheels 13 are driven. The tractor also comprises a pair of front, steerable, ground-engaging wheels 14 and an operator cab 15.

Figure 3:
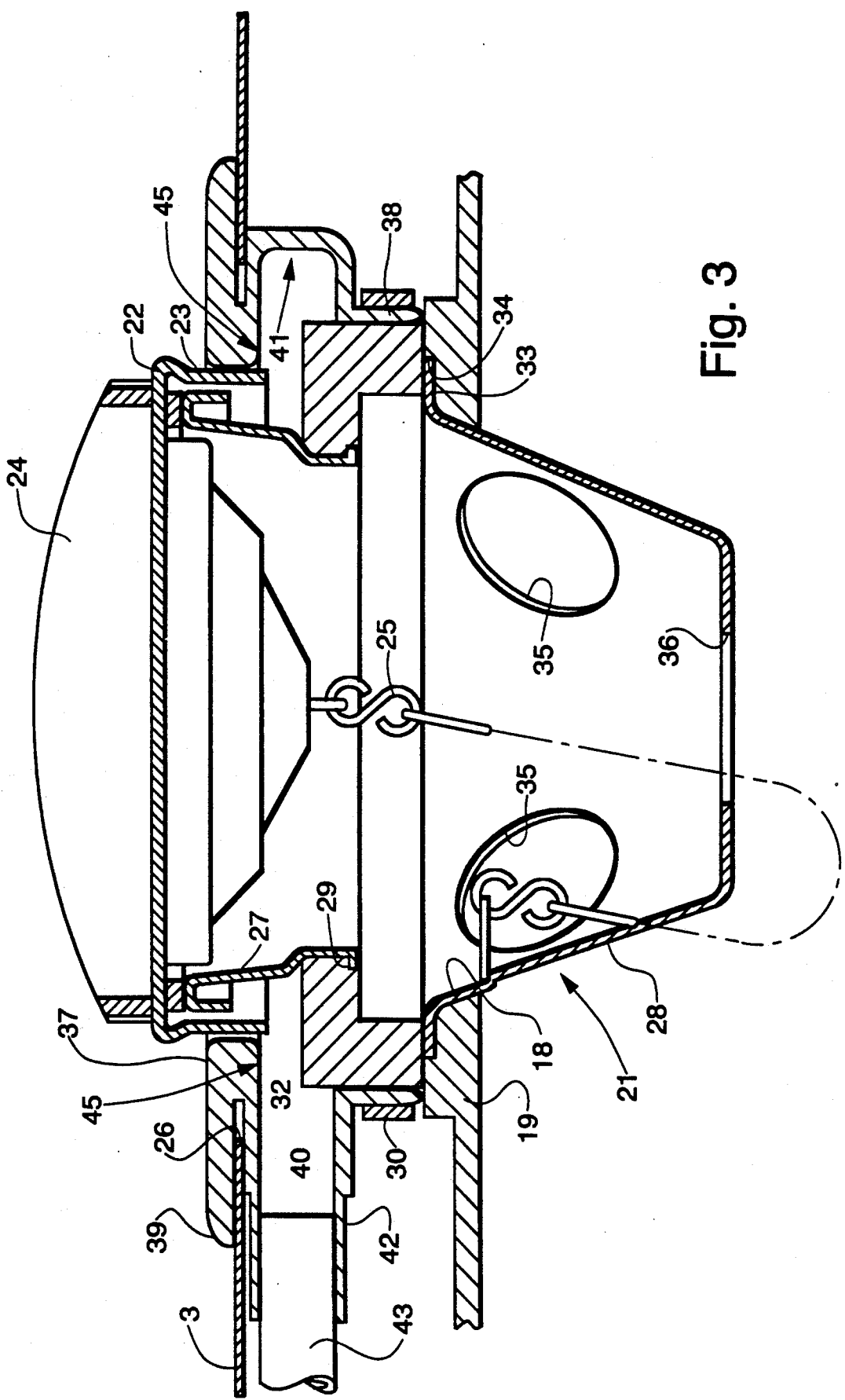
FIG. 3 is an enlarged cross-sectional view of part of FIG. 2.

In accordance with one aspect of the present invention, the fuel tank assembly 7 comprises a fuel tank 17 which may be molded from a synthetic plastics material. As best seen in FIG. 3, the fuel tank 17 is provided with a fuel inlet by way of an aperture 18 in its top wall 19. Fitted in the fuel inlet aperture 18 is a filler neck or tube 21, the outer inlet end of which releasably receives a filler cap 22 of conventional design and having a peripheral skirt 23 which extends around and downwardly of the filler tube inlet. The filler cap 22 is provided with a central upstanding member 24 to enable manual fitting and release of the cap to the filler tube 21. A chain 25 is connected between the filler cap 22 and the filler tube 21 in order to hold captive this filler cap 22 when removed from said filler tube 21.

The filler tube 21 extends through an aperture 26 in the top panel 3 of the engine compartment cover and comprises an outer, generally cylindrical portion 27 and a separate inner and generally conical cup-shaped portion 28. The outer portion 27 is stepped so that the diameter of the inner end thereof is less than that of the outer end thereof; this inner end being provided with an out-turned flange 29 which is received in a corresponding annular slot or channel in a collar 32 composed of a synthetic plastics material. The inner portion 28 of the filler tube 21 has an out-turned flange 33 which sits in a counter-bore 34 in the fuel inlet aperture 18 in the top wall 19 of the fuel tank 17.

The collar 32 may be bonded or otherwise secured to the top wall 19 of the fuel tank 17, whereby the overall filler tube 21 comprising the inner and outer portions 28 and 27 is secured in position relative to the fuel tank 17. Vent apertures 35 are provided in the side wall of the inner portion 28 of the filler tube 21; the diameter of these vent apertures 35 generally being the same as a fuel inlet aperture 36 provided in the bottom of the cup-shaped inner portion 28 of the filler tube 21. It will be seen that the tapered side wall of the inner portion 28 of the filler tube 21 presents the vent apertures 35 at an angle relative to the longitudinal axis of the filler tube 21.

The fuel tank assembly 7 also comprises a generally cylindrical grommet 37 comprising an annular skirt 38 at one end, which skirt 38 encircles the collar 32 of the filler tube 21 and is secured thereto by a hose clamp 30, or similar device, shown only in FIG. 3 of the drawings. The grommet 37 is composed of a flexible, synthetic plastics material which lends itself to a sealing engagement with the collar 32 when clamped thereon. At the other end of the grommet 37 there are provided a pair of spaced flanges 39 and 40; the space between these two flanges receiving the edge portion of the aperture 26 in the top panel 3 in conventional grommet fashion. Disposed between the flanges 39 and 40 and the skirt 38 is an overflow channel 41 which is annular in shape with the side thereof facing the filler tube 21 being open.

In the wall of the overflow channel 41 opposite the open side, there is provided a drain outlet 42 in the form of a cylindrical extension which receives internally a drain pipe 43. In order to drain any spilled fuel as quickly as possible, it is desirable to maximize the internal diameter of the drain pipe 43 and in the illustrated embodiment, this dimension is 15 mm. The drain pipe 43 is in the form of a flexible hose which is routed from the outlet 42 across the top of the fuel tank 17 and down one side thereof so that the outlet end of the pipe 43 is generally adjacent the ground to which spilled fuel is discharged. The drain pipe 43 is held in position by clips 44.

It will be seen that the top panel 3 of the engine compartment cover is inclined and hence the grommet 37, when fitted, also is inclined. The outlet 42 of overflow channel 41 is disposed so as to be at the lowest part of the grommet 37 when the latter is assembled on the filler tube 21. Thus, any spilled fuel will readily drain from the overflow channel 41 to the drain pipe 43.

In use, the filler cap 22 is removed from the outer filler tube portion 27 but held captive by the chain 25. The fuel tank is then replenished with fuel either by way of using a fuel filler nozzle connected to the end of a hose which in turn is connected to a reservoir of fuel and, in this case, the nozzle may be placed either in the aperture 36 in the inner portion 28 of the filler tube 21 or in one of the vent apertures 35, if such are presented so as to receive the fuel nozzle. In either of these ways, the fuel nozzle is positively retained in position and can be left on auto-fill without fear of the nozzle becoming dislodged.

With the filler cap 22 removed, it will be seen that the overflow channel 41 of the grommet 37, in fact, forms part of an overall overflow channel indicated generally at 45 and defined, on one side, by the overflow channel 41 of the grommet 37 and, on the other, by the outer wall of the outer filler tube portion 27 and the top wall or surface of the collar 32. Thus, should any fuel spill out from the outer filler tube portion 27, it will be received in the overall overflow channel 45, gather in the grommet overflow channel 41 and drain to ground through the drain pipe 43. This will also happen if overflow or spillage takes place due to the use of a jerrycan in order to replenish fuel in the fuel tank 17. However, the risk of spillage is much reduced when using this method because of the enlarged filler tube inlet presented by the outer portion 27 of the filler tube 21.

When the fuel tank 17 has been replenished, the filler cap 22 is replaced and it will be seen that the cap 22 is dimensioned so as substantially to close the entrance to the overall overflow channel 45 and thus at least substantially restrict if not prevent the ingress of dust and dirt which would otherwise be attracted to the film of fuel inevitably remaining in the channel 45 with the possibility eventually of the drain outlet 42 becoming blocked.

Figure 4:
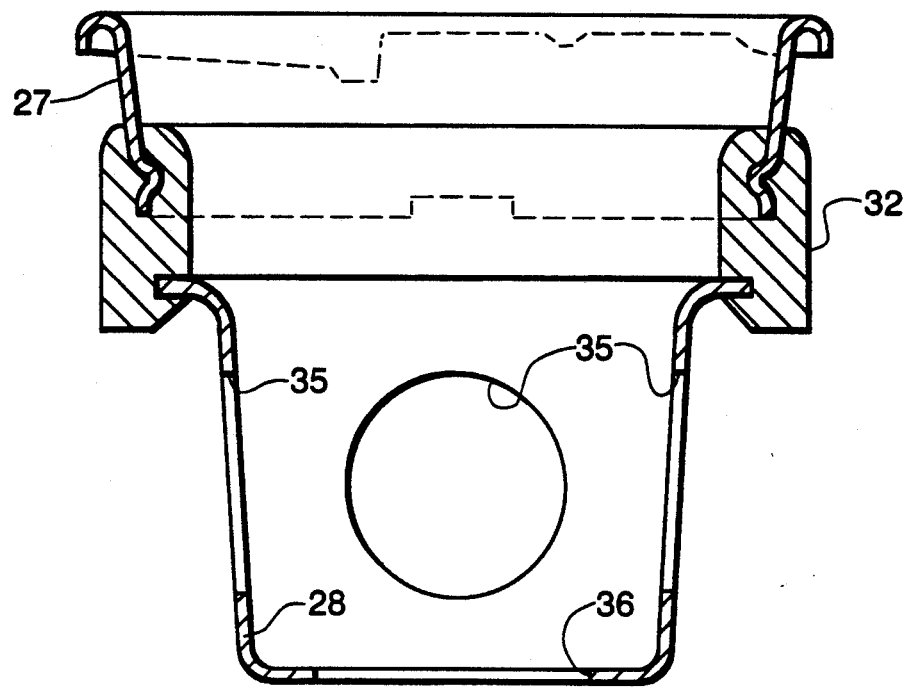
FIG. 4 is a cross-sectional view of an alternative to a component shown in FIG. 3.

Turning now to FIG. 4, this illustrates an alternative construction of filler tube 21 in which both the outer and inner portions 27 and 28 are molded into the collar 32 and the collar 32 itself is bonded to the top 19 of the fuel tank 17 around the fuel inlet aperture 18 therein. It has been found that this is a more convenient filler tube construction to handle from the assembly point of view. The skirt 38 of the grommet 37 (not shown in FIG. 4) again is clamped around the collar 32.

It will be seen that in this alternative arrangement, the taper on the inner portion 28 of the filler tube 21 is less severe than that illustrated in FIG. 3, whereby the vent apertures 35 are not so well presented for the reception of a fuel supply nozzle although this will depend upon the construction of the fuel supply nozzle.

It will be seen that the present invention provides a simple but highly effective means of significantly reducing the risk of fuel overflowing on to the bodywork of the vehicle should spillage occur, thus avoiding unsightly films of fuel which gather dust and dirt. More importantly, in the illustrated embodiment in which the fuel tank 17 is disposed forwardly of the radiator 8 of the cooling system for the engine 11, the invention equally significantly reduces the risk of any spilled fuel, which otherwise might reach the inside of the engine compartment cover, to be sucked through the radiator 8 by the fan 9 and blown on to the windscreen of the cab 15.

Consequently, dust and dirt, which inevitably also are drawn in with the air, have a substantially lesser tendency to collect on the core of the radiator 8 which otherwise could, in due course, lead to a blockage of the latter with consequential overheating of the engine. Also, the risk of dust and dirt being attracted to a film of fuel on the windscreen, which, of course, would severely impair the visibility of the operator, equally has been reduced very substantially with the present invention.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

We claim:

1. In a vehicle comprising a base frame structure, bodywork supported by said base frame structure, and a fuel tank assembly mounted on said base frame structure, an improved fuel tank assembly comprising:

said fuel tank being provided with a filler neck having an inlet opening positioned such that access to said inlet opening is gained through an aperture in a panel forming part of said bodywork, said filler neck further having an outer portion of a first cross-sectional area and an adjacent inner portion of a second cross-sectional area, the second cross-sectional area being smaller than the firsts cross-sectional area, the outer portion of said filler neck being attached to a collar, the inner portion of said filler neck being received in a counter-bore in a fuel inlet aperture of the fuel tank with said fuel tank; and a grommet having a skirt at one end encircling said filler neck, at least one flange at another end engaging an edge portion of said aperture in said panel, and an overflow channel disposed between said flange and said skirt and surrounding said inlet of said filler neck, said overflow channel being provided with an outlet connectable to a drain pipe.

2. A vehicle according to claim 1 wherein the fuel tank assembly further comprises a filler cap engageable with said filler neck to close said inlet opening, said filler cap being operable to close substantially an entrance to the overflow channel in said grommet and, thereby, deny access of foreign matter to said overflow channel.

3. A vehicle according to claim 2 wherein said skirt of said grommet is attached to the filler tube by a hose clamp.

4. A vehicle according to claim 1 wherein said grommet further has a pair of spaced-apart flanges at said other end and cooperable with said edge portion of said aperture in said panel.

5. A vehicle according to claim 1 wherein the inner and outer portions of the filler neck are integral.

6. A vehicle according to claim 1 wherein the outer and inner portions of the filler neck are formed separately.

7. A vehicle according to claim 6 wherein the outer portion of the filler neck is constructed of a synthetic plastics material, the inner portion of said filler neck being composed of a synthetic plastics material and said collar being bonded to said fuel tank around the fuel inlet aperture thereof.

8. A vehicle according to claim 6 wherein the outer and inner portions of the filler neck are attached to a collar composed of a synthetic plastics material, said fuel tank also being composed of a synthetic plastics material with said collar being bonded to the fuel tank around the fuel inlet aperture thereof.

9. A vehicle according to claim 6 wherein the outer and inner portions of the filler neck are each tapered.

10. A vehicle according to claim 6 wherein the inner portion of the filler neck is cup-shaped with the open end thereof facing the outer portion of said filler neck and with a fuel inlet aperture being provided in the bottom of the cup.

11. A vehicle according to claim 10 wherein the fuel inlet aperture of the inner portion of the filler neck is dimensioned so as, in use, snugly to receive a fuel filler nozzle connected to a fuel reservoir.

12. A vehicle according to claim 6 wherein the side wall of the inner portion of the filler neck is provided with at least one vent aperture through which air expelled from the fuel tank.

13. A vehicle according to claim 12 wherein said at least one vent aperture in the inner portion of the filler neck is dimensioned so as, in use, snugly to receive a fuel filler nozzle of a fuel hose connected to a fuel reservoir.

14. In a fuel tank assembly for a vehicle having a fuel tank fitted with a filler neck, an improved filler neck comprising:

an outer portion of a first cross-sectional area and an adjacent inner portion of a second cross-sectional area which is smaller than the first cross-sectional area, said outer and inner portions of the filler neck being attached to a collar composed of a synthetic plastics material, said fuel tank also being composed of a synthetic plastics material with said collar being bonded to the fuel tank around the fuel inlet aperture thereof.

15. A fuel tank assembly according to claim 14 wherein the inner and outer portions of the filler neck are integral.

16. A fuel tank assembly according to claim 14 wherein the outer and inner portions of the filler neck are formed separately.

17. A fuel tank assembly according to claim 14 wherein the outer and inner portions of the filler neck are each tapered.

* * * * *